US008838532B2

(12) United States Patent
Fan et al.

(10) Patent No.: US 8,838,532 B2
(45) Date of Patent: Sep. 16, 2014

(54) COLLABORATIVE SELF-SERVICE CONTACT ARCHITECTURE WITH AUTOMATIC BLOG CONTENT MAPPING CAPABILITY

(75) Inventors: James Fan, San Ramon, CA (US); Deva-Datta Sharma, San Ramon, CA (US); Jennifer K. Lam, Fremont, CA (US); Eric Towell, Mukwonago, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 498 days.

(21) Appl. No.: 12/343,542

(22) Filed: Dec. 24, 2008

(65) Prior Publication Data

US 2010/0161579 A1  Jun. 24, 2010

(51) Int. Cl.
*G06F 17/30* (2006.01)
*G06Q 10/00* (2012.01)

(52) U.S. Cl.
CPC .............. *G06F 17/30864* (2013.01); *G06Q 10/00* (2013.01)
USPC ........... 707/613; 707/617; 707/620; 707/716; 707/717

(58) Field of Classification Search
None
See application file for complete search history.

(56) References Cited

U.S. PATENT DOCUMENTS

| 7,293,015 | B2 * | 11/2007 | Zhou .................................... 1/1 |
| 2001/0038638 | A1 * | 11/2001 | Slowe et al. .................. 370/465 |
| 2002/0120464 | A1 * | 8/2002 | Kirk .................................. 705/1 |
| 2003/0004786 | A1 * | 1/2003 | Tokieda et al. ................. 705/10 |
| 2004/0225716 | A1 * | 11/2004 | Shamir et al. ................. 709/204 |
| 2005/0071440 | A1 * | 3/2005 | Jones et al. .................... 709/218 |
| 2005/0165719 | A1 * | 7/2005 | Greenspan et al. .............. 707/1 |
| 2005/0216363 | A1 * | 9/2005 | Vaccarelli et al. ............. 705/26 |
| 2006/0101143 | A1 * | 5/2006 | Garcia et al. .................. 709/225 |
| 2006/0106774 | A1 * | 5/2006 | Cohen et al. ...................... 707/3 |
| 2006/0218288 | A1 * | 9/2006 | Umezawa et al. ............ 709/228 |
| 2007/0015494 | A1 * | 1/2007 | Sinclair et al. ............. 455/414.1 |
| 2007/0027893 | A1 * | 2/2007 | Gundy et al. ................. 707/102 |
| 2007/0150512 | A1 * | 6/2007 | Kong et al. ................. 707/104.1 |
| 2007/0156813 | A1 * | 7/2007 | Galvez et al. ................. 709/204 |
| 2007/0250494 | A1 * | 10/2007 | Peoples et al. ................... 707/4 |
| 2008/0162688 | A1 * | 7/2008 | Reumann et al. ............ 709/224 |
| 2008/0215682 | A1 * | 9/2008 | Vilis ............................. 709/204 |
| 2009/0292687 | A1 * | 11/2009 | Fan et al. ......................... 707/5 |

* cited by examiner

*Primary Examiner* — Mohammad S Rostami
(74) *Attorney, Agent, or Firm* — Greenblum & Bernstein, P.L.C.

(57) ABSTRACT

Resolving an issue raised by at least one user includes establishing a contact session over a communication channel for servicing the issue. The Internet is searched for content related to providing a resolution for the issue using a customized query, when a search of a database does not return results. Content obtained from at least one Internet source as a result of searching the Internet using the customized query is restructured to prepare the resolution for the issue. The at least one Internet source from which the content was obtained is updated with the resolution.

17 Claims, 6 Drawing Sheets

COLLABORATIVE SELF-SERVICE CONTACT ARCHITECTURE WITH AUTOMATIC BLOG CONTENT MAPPING CAPABILITY

BACKGROUND

1. Field of the Disclosure

The present disclosure relates to a self-service contact architecture. More particularly, the present disclosure relates to accurately and efficiently diagnosing an issue reported via the self-service contact architecture.

2. Background Information

Service providers sometimes offer self-service channels to allow customers to purchase products and services, inquire about product information, or report and diagnose problems. Self-service options reduce the cost of supporting a live technician. Customers may use different communication channels to initiate the self-service process. For example, a customer may initiate the self-service process via either an interactive voice response system or via web-based Internet access. Each customer accesses these self-service channels individually, without aid from either technicians or other customers.

Such order placement processes and their underlying architecture may be designed using a one-to-one model, for example, one customer to one self-service portal. Further, customers may directly and individually interact with an Internet web log (i.e. a blog) for obtaining information related to diagnosing issues.

DETAILED DESCRIPTION

Figure 1:
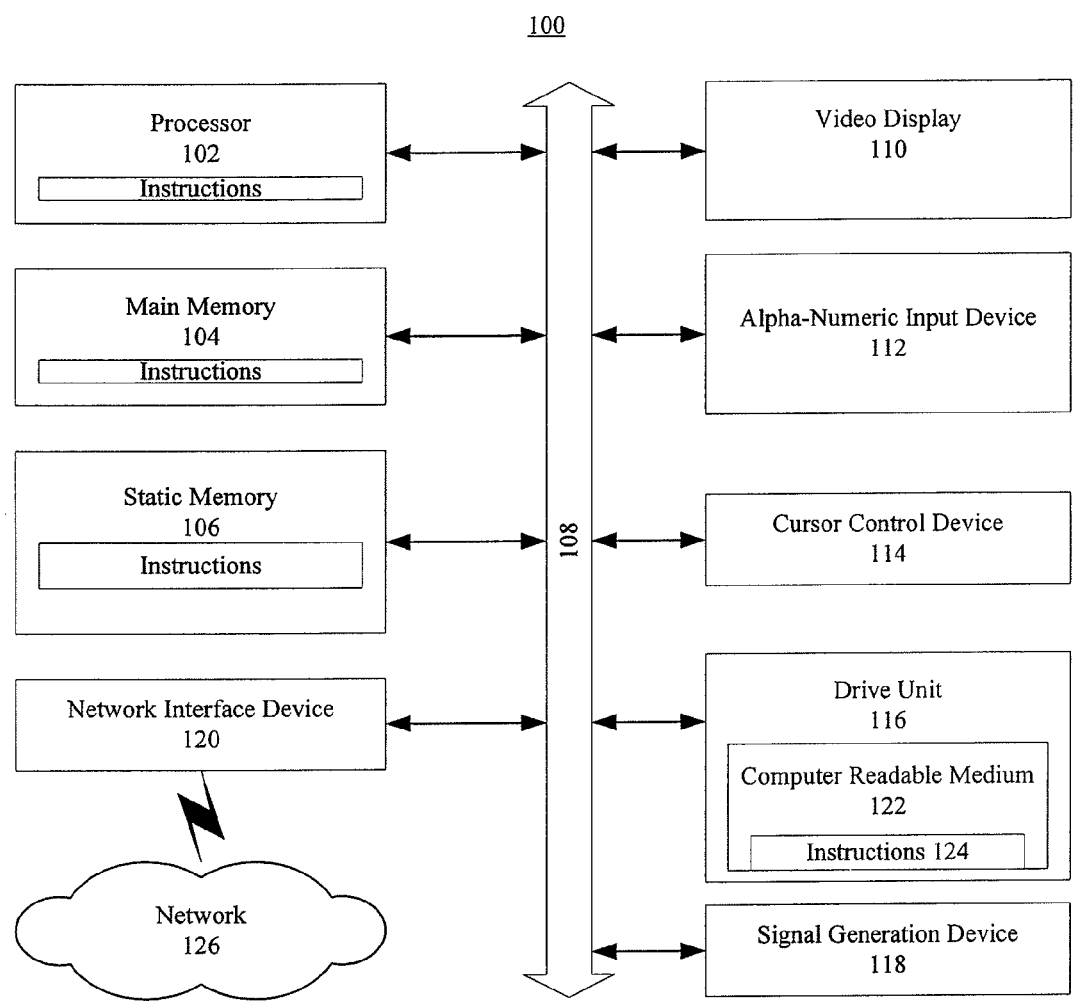
FIG. 1 shows an exemplary general computer system that includes a set of instructions for a collaborative self-service contact architecture with auto blog content mapping capability.

In view of the foregoing, the present disclosure, through one or more of its various aspects, embodiments and/or specific features or sub-components, is thus intended to bring out one or more of the advantages as specifically noted below.

According to an aspect of the present disclosure, a method for resolving an issue raised by at least one user includes establishing a contact session over a communication channel for servicing the issue. The method includes searching the Internet for content related to providing a resolution for the issue using a customized query, when a search of a database does not return results. The method includes restructuring content obtained from at least one Internet source as a result of searching the Internet using the customized query to prepare the resolution for the issue. The method includes updating the at least one Internet source from which the content was obtained with the resolution.

According to another aspect of the present disclosure, the customized query is based on at least one of: information provided by the at least one user and stored information.

According to yet another aspect of the present disclosure, the stored information relates to issues previously reported by customers, product information, service contract information, device model information and knowledge management content.

According to still another aspect of the present disclosure, searching the Internet comprises searching for a pre-selected set of Internet web logs.

According to one aspect of the present disclosure, the result of searching the Internet is correlated with a case number provided to the at least one user. The result of searching the Internet and the case number are stored in a second database.

According to another aspect of the present disclosure, the method includes analyzing the content to prepare a task flow to assist the at least one user in implementing the resolution.

According to yet another aspect of the present disclosure, the method includes updating at least one of an intranet, the at least one Internet source from which the content was obtained, a knowledge management database, and an Internet website for a service provider with the task flow implementing the resolution.

According to still another aspect of the present invention, at least one of the restructured content and the updated at least one Internet source is used to assist a subsequent user in resolving a related issue.

According to an aspect of the present disclosure, a system for resolving an issue raised by at least one user includes at least one processor operable to establish a contact session over a communication channel for servicing the issue. The system includes a searcher operable to search the Internet for content related to providing a resolution for the issue using a customized query, when a search of a database does not return results. The system includes a restructuring processor operable to restructure content obtained from at least one Internet source as a result of searching the Internet using the customized query to prepare the resolution for the issue. The system includes an updater operable to update the at least one Internet source from which the content was obtained with the resolution.

According to another aspect of the present disclosure, the issue is related to at least one of products and services provided by a service provider.

According to yet another aspect of the present disclosure, a second user joins the contact session using a case number assigned to the contact session.

According to still another aspect of the present disclosure the at least one user accesses common communication content of the contact session via a first communication channel that is distinct from a second communication channel used by the second user to access the common communication content of the contact session.

According to an aspect of the present disclosure, the common communication content is translated into a language specified by either the at least one user or the second user.

According to another aspect of the present disclosure, the system includes a correlator operable to correlate a file to the contact session.

According to yet another aspect of the present disclosure, the file is translated into a language specified by either of the at least one user or the second user.

According to an aspect of the present disclosure, the file is one of a video file, an audio file and a text file.

According to an aspect of the present disclosure, a tangible computer readable medium storing a computer program, recorded on the tangible computer readable medium for resolving an issue raised by at least one user includes an establishing code, recorded on the tangible computer readable medium, executable to establish a contact session over a communication channel for servicing the issue. The tangible computer readable medium includes a searching code, recorded on the tangible computer readable medium, executable to search the Internet for content related to providing a resolution for the issue using a customized query, when a search of a database does not return results. The tangible computer readable medium includes a restructuring code, recorded on the tangible computer readable medium, executable to restructure content obtained from at least one Internet source as a result of searching the Internet using the customized query to prepare the resolution for the issue. The tangible computer readable medium includes an updating code, recorded on the tangible computer readable medium, executable to update the at least one Internet source from which the content was obtained with the resolution.

According to another aspect of the present disclosure, a software trigger obtains key words from common communication content of the contact session to form the customized query.

According to yet another aspect of the present disclosure, a subsequent user uses the key words during the contact session.

According to still another aspect of the present disclosure, the customized query is used to assist a subsequent user in resolving a related issue.

FIG. 1 is an illustrative embodiment of a general computer system, on which a method to provide a collaborative self-service contact architecture with auto blogging content mapping capability can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 126, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 102, for example, a central processing unit (CPU), a graphics processing unit (GPU), or both. Moreover, the computer system 100 can include a main memory 104 and a static memory 106 that can communicate with each other via a bus 108. As shown, the computer system 100 may further include a video display unit 110, such as a liquid crystal display (LCD), an organic light emitting diode (OLED), a flat panel display, a solid state display, or a cathode ray tube (CRT). Additionally, the computer system 100 may include an input device 112, such as a keyboard, and a cursor control device 114, such as a mouse. The computer system 100 can also include a disk drive unit 116, a signal generation device 118, such as a speaker or remote control, and a network interface device 120.

In a particular embodiment, as depicted in FIG. 1, the disk drive unit 116 may include a computer-readable medium 122 in which one or more sets of instructions 124, e.g. software, can be embedded. A computer-readable medium 122 is a tangible article of manufacture, from which sets of instructions 124 can be read. Further, the instructions 124 may embody one or more of the methods or logic as described herein. In a particular embodiment, the instructions 124 may reside completely, or at least partially, within the main memory 104, the static memory 106, and/or within the processor 102 during execution by the computer system 100. The main memory 104 and the processor 102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 122 that includes instructions 124 or receives and executes instructions 124 responsive to a propagated signal, so that a device connected to a network 126 can communicate voice, video or data over the network 126. Further, the instructions 124 may be transmitted or received over the network 126 via the network interface device 120.

Multiple customers are enabled to join a collaborative self-service contact session. Language translation ensures that the collaborative contact session is logged with as much detail as possible. For example, a child may help an elderly parent to report an issue with Internet connectivity or assist in the placement of an order using a collaborative self-service contact session. The child may live at a different geographic location from the elderly parent and accordingly, may not be able to use the same Internet channel or telephone channel to contact a service provider. In this case, the child may contact the service provider via a telephone channel and provide the parent with a case number assigned to the contact session. The parent uses the case number to join the contact session, for example, via the Internet and is enabled to jointly communicate or report an issue to the service provider. It is noted that the term "issue" is non-limiting and refers to any reason a user, customer or subscriber initiates a contact with a service provider.

Key words are used to search a specified set of Internet web logs to correlate search results with information logged from either an individual contact session or a collaborative contact session. The search results assist a customer or customers in attaining a resolution to a reported issue. An internal support agent may use the results of a search of the specified set of Internet web logs to publish an restructured resolution, task flow implementing the resolution or other information related to resolving the reported issue to one or more Internet web logs.

Figure 2:
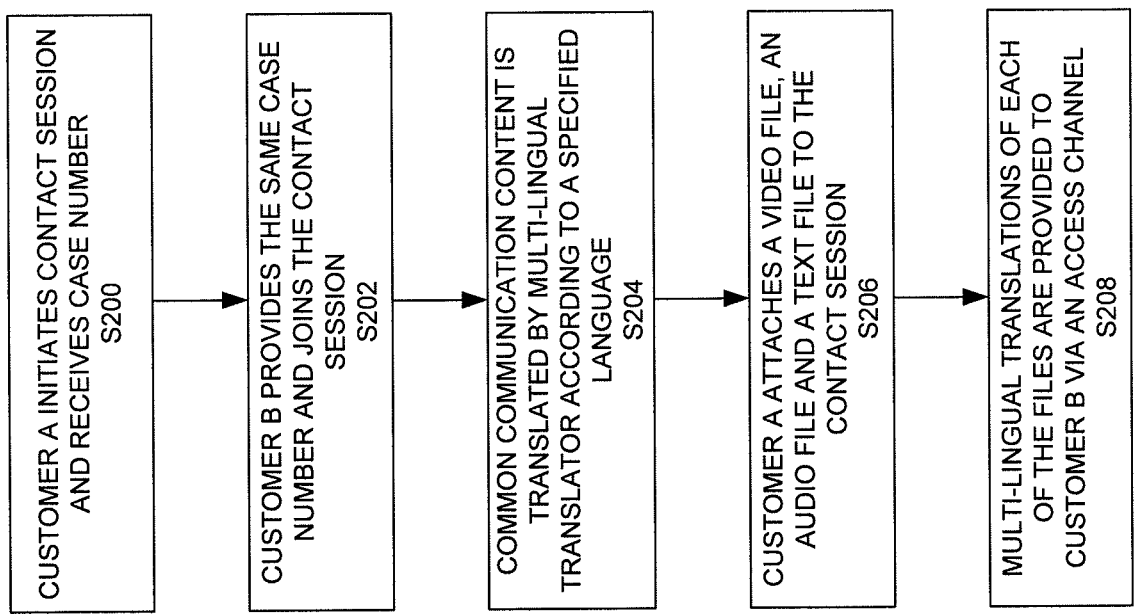
FIG. 2 is a process flow diagram for communicating in a collaborative self-service contact session, according to an aspect of the present disclosure.

In FIG. 2, a method for joining multiple customers in a collaborative self-service contact session is shown. In step S200, customer A initiates an individual contact session, which is assigned a case number, via a first access channel. In one non-limiting embodiment, the first access channel is a telephone connection to an interactive voice response system. In another non-limiting embodiment, the first access channel is an Internet connection to a web portal for a service provider. It is noted that the access channel may be any channel used to initiate a connection or communication including, but not limited to: telephone call, text messaging, video conferencing, and messaging via an Internet or intranet chat client. In step S202, customer B provides the same case number assigned to the individual contact session initiated by customer A. Customer B receives the case number from customer A. In another non-limiting embodiment, customer B receives the case number from a service provider, the service provider receiving an instruction from customer A or other party to provide the case number to customer B. By providing the same case number, customer B is able to join the same contact session, which is now a collaborative self-service contact session, via the same access channel, or via a different access channel. Accordingly, customer A and customer B are enabled to use the collaborative self-service contact session to jointly report a common issue.

It is noted that any number of customers may be supported in the collaborative self-service contact session by providing the same case number given to a customer originally initiating a contact session. In one embodiment, customers joining the collaborative self-service contact session are geographically distributed. In another embodiment, customers joining the collaborative self-service contact session are not geographically distributed, but access the session via a number of distinct access channels.

Customer A and customer B share a common issue related to products or services provided by a service provider. In the event that customer A and customer B do not understand the same language or an agent assisting customer A and customer B does not understand a language spoken by either or both customer A and customer B, in step S204, multi-lingual translation support is provided according to a language option selected by either or both customer A and customer B. This feature will be described in greater detail with respect to FIG. 3. In step S206, in one embodiment, either party attaches a voice file, text file, and/or a video file including supporting documents to assist in attaining a solution to the issue. In step S208, multi-lingual translations are provided for each of the attached files. In one embodiment, multi-lingual translations are provided to a customer via the same access channel over which the customer accesses the collaborative self-service session. In another embodiment, multi-lingual translations are provided to a customer via an access channel different from the access channel over which the customer accesses the collaborative self-service session.

Figure 3:
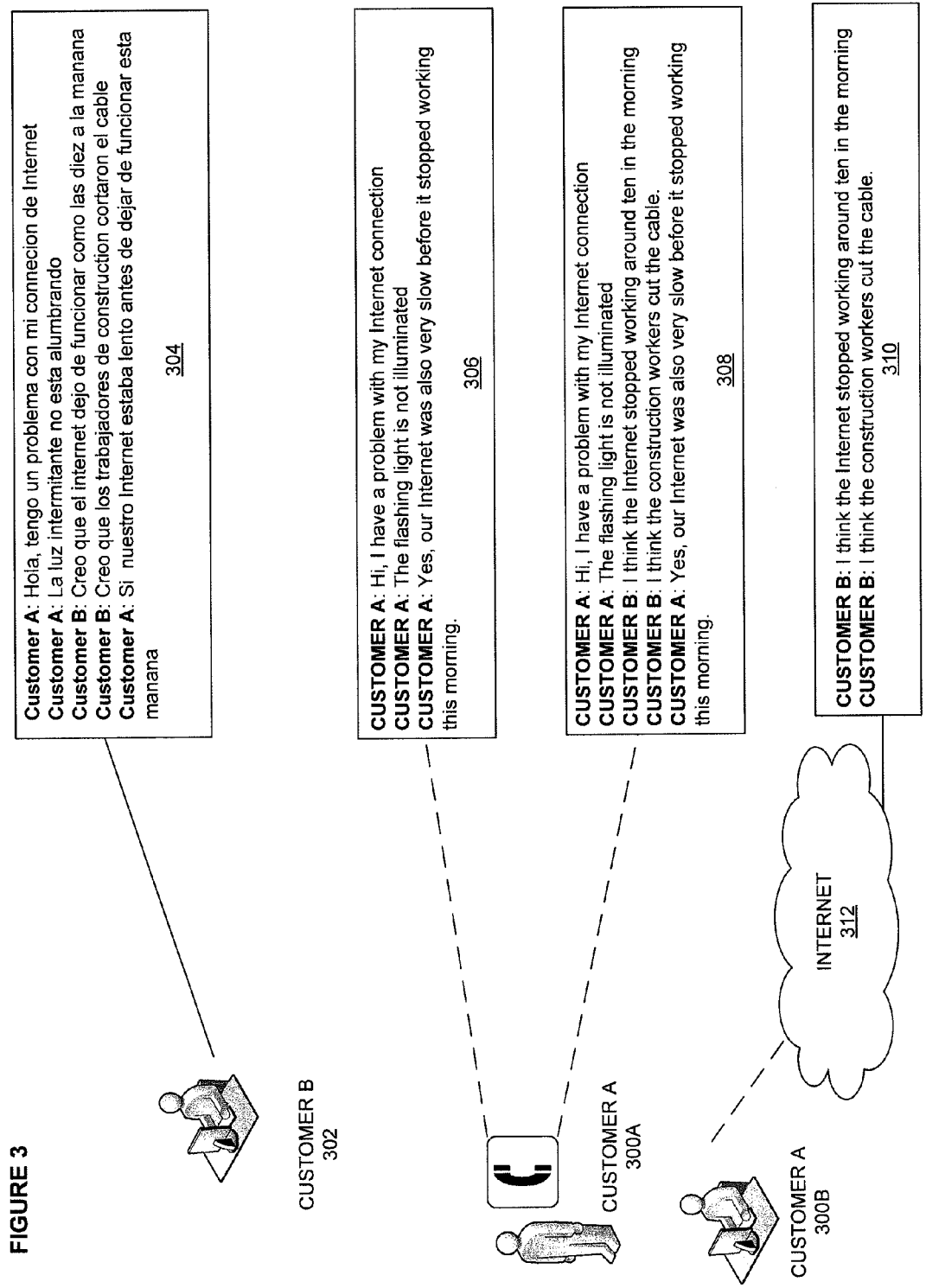
FIG. 3 illustrates an exemplary collaborative self-service contact session with multi-lingual translation, according to an aspect of the present disclosure.

In FIG. 3, an exemplary collaborative session environment is shown. Customer A 300A calls via a telephone channel into a collaborative self-service contact session and receives a case number. Customer A communicates regarding his issue of Internet connectivity in English as shown in dialog box 306. Customer B 302 communicates via an Internet channel using a chat client to join the collaborative self-service contact session by providing the case number. Communication by customer A 300A is translated for customer B 302 into Spanish and displayed on the chat client display screen as shown in box 304. Customer A 300 may receive an auditory translation of the Spanish language communication spoken by customer B 302 via a telephone channel as shown in box 308. In an alternative embodiment, customer A receives a textual translation 310 of the Spanish language communication spoken by customer B via an Internet channel. The textual translation 310 is received by a device 300B for customer A 300, for example, a computing device, mobile telephone, cellular phone, personal digital assistant, or any other device capable of receiving message delivery in any of: audible, textual and video formats.

Figure 4:
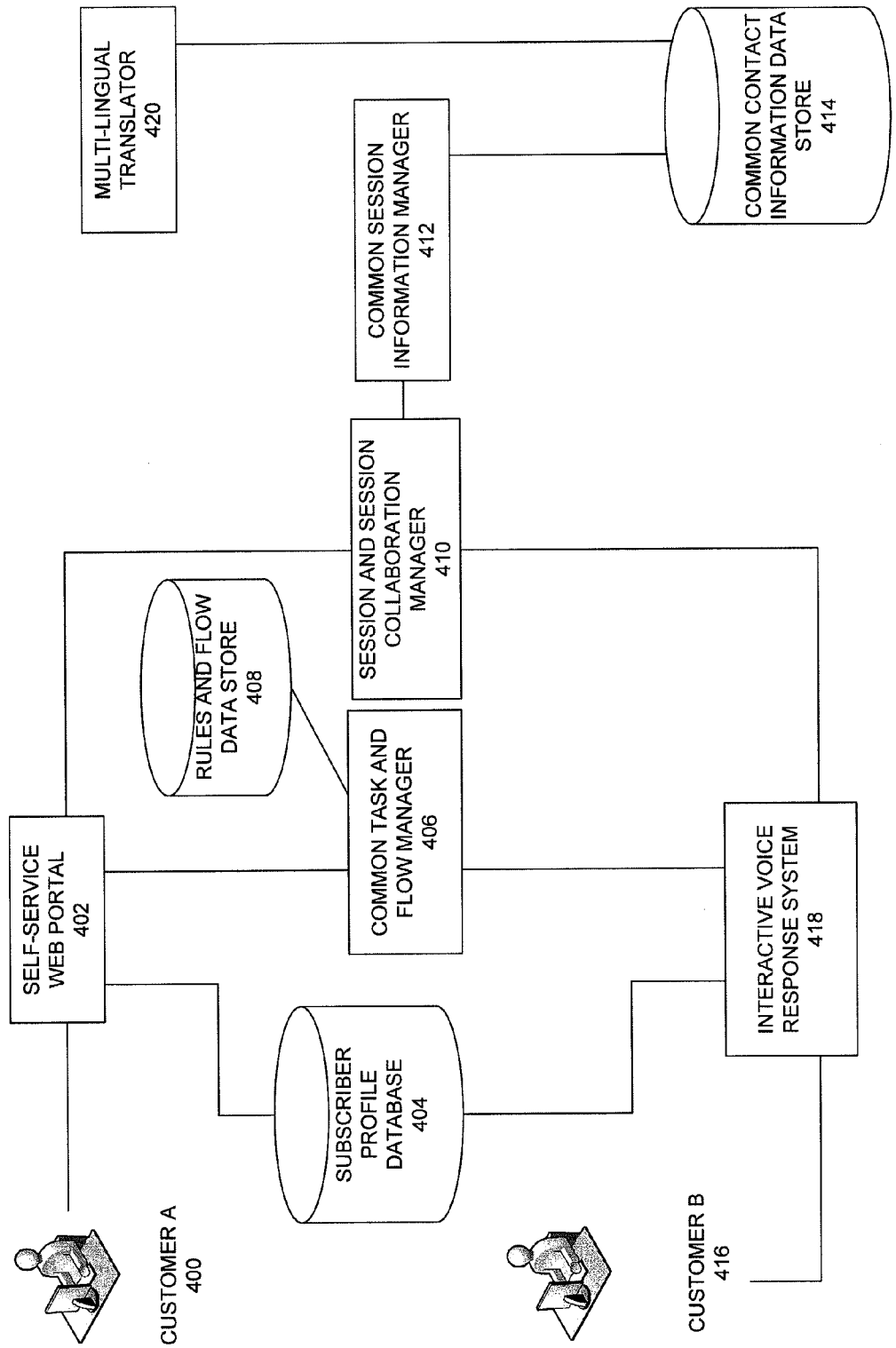
FIG. 4 illustrates a general system diagram of an architecture implementing a collaborative session environment, according to an aspect of the present disclosure.

In FIG. 4, a general system diagram of an architecture implementing a collaborative session environment is shown. Customer A 400 initiates a contact session via an Internet channel using a session collaboration manager. A web portal accesses a subscriber profile database 404 to obtain information as whether the customer is an existing subscriber and if so, a set of subscribed products and services associated with the customer. In particular, subscriber profile database 404 stores information about products and services a subscriber has ordered in the past, pending order information, billing status as well as recently reported issues. A case number, for example, "1234" is assigned to the contact session. The contact session, for example, a contact session associated with a communication received over the Internet, is provided to common task and flow manager 406. Common task and flow manager 406 allows customer interaction coming from the various access channels (e.g., interactive voice response channel and Internet channel) to share common task rules and workflows wherever applicable. Based on customer communication obtained during the contact session, a corresponding task or workflow is fetched from rules and flow data store 408. For example, if a customer initiates a telephone call to resolve an issue with their Internet connectivity, a workflow including steps of: 1) checking the modem lights; 2) rebooting the computer; and 3) making sure the Internet cable is plugged in would be fetched from rules and flow data store 408.

The contact session is monitored and a log recording the contents of the contact session is collected by a common session information manager 412. Common session information manager ensures 412 that contact session information triggered via an access channel is maintained in the common contact information data store 414.

The collected contact session log is stored in the common contact information data store 414. Common contact information data store 414 logs customer interaction activities via either or both of individual contact sessions and collaborative contact sessions. Customer B 416 is asked to join a collaborative session to access the contact session having the same case number. Customer B 414 initiates a contact session via an interactive voice response system 418. It is noted that customer A 400 and customer B 414 may join a collaborative session via the same or different channels. For example, both customer A 400 and customer B 414 may access the collaborative session via an Internet channel. As another non-limiting example, customer A 400 and customer B 414 may access the collaborative session via a telephone channel.

The interactive voice response system 418 accesses a subscriber profile database 404 to obtain information as to whether customer B 414 is an existing subscriber and if so, a set of subscribed products and services associated with the customer. Customer B 414 provides the same case number 1234 used by customer A 400 to access the contents of the contact session (e.g., via an Internet channel) for customer A 400. In this manner, customer B 414 avoids the necessity of a new case number assigned to the contact session initiated via the interactive voice response system 418.

In one non-limiting embodiment, customer B 414 selects an option indicating that he/she will communicate in a language that is different from the language used by customer A 400. When customer B 414 joins a contact session, common task and flow manager 406 determines a which flow is being used to resolve an issue or issues reported by customers currently participating in the contact session. Further, common task and flow manager 406 determines which step or task of the flow the currently participating customers are currently performing. That is, common task and flow manager 406 synchronizes the place in the process of resolving the issue for later arriving customers with currently participating customers. Customer B 414 is assigned to the same flow and task as the flow and task that is currently supporting the collaborative session represented by case number "1234". Rules and flow data store 408 contains rules and workflows that are used to support how a service provider or agents of a service provider interact with contact sessions initiated by, for example, an interactive voice response system and the Internet. For example, rules include, but are not limited to: routing rules for a telephone call initiated contact session and contact center domain rules. The contact session initiated via the interactive voice response system channel is bridged to the contact session initiated via the Internet channel using session collaboration manager 410. The collaborative session information (including language option) is provided to common session information manager 412. The common session information manager 412 retrieves collaborative session information from common contact information data store 414 providing a selected language option indicated by customer B 414.

Common contact information data store 414 fetches the collaborative session information and requests multi-lingual translator 420 to translate the contents of the collaborative session for customer B 414 to a selected language. Multi-lingual translator 420 is enabled to translate oral dialog, attached files, and any communication occurring during a contact session. Further, multilingual translator 420 is enabled to translate information stored in common contact information data store 414. That is, communication by customer A 400 is translated into a language selected by customer B 414. Additionally, if a language option is selected by customer A 400, communication by customer B 414 is translated for customer A 400. Translated communication is sent back to common session information manager 412. In this manner, customer B 414 is enabled to listen through the interactive voice response system 418 to translated communication in order to participate in a collaborative session. In one non-limiting embodiment, during a contact session, either or both customer A and customer B attach voice files, text files and/or video files to provide supporting information for resolving the issue. Multi-lingual translation is provided for each of the pieces of supporting information.

Figure 5:
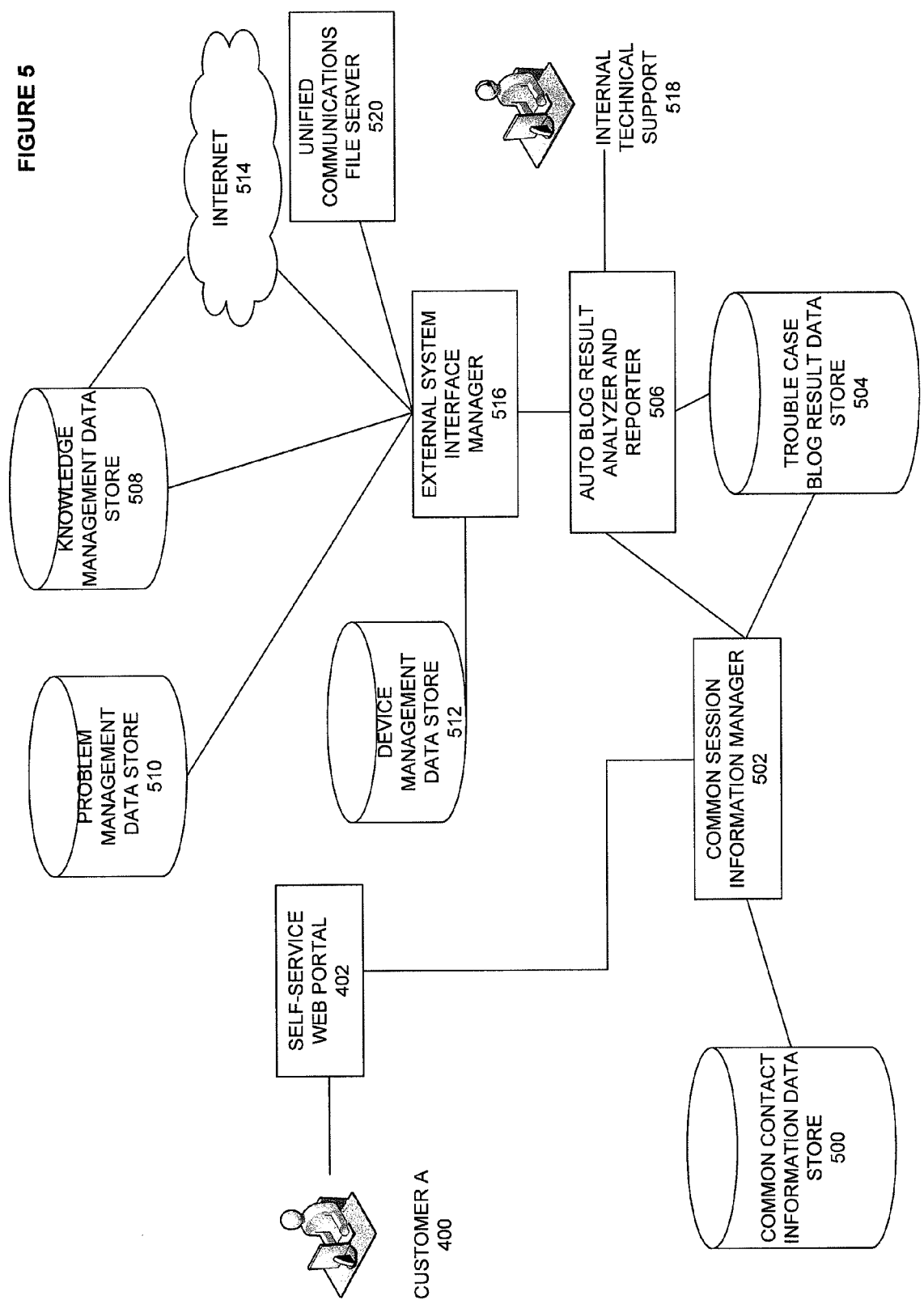
FIG. 5 illustrates a general system diagram of an architecture implementing an auto blogging content mapping capability, according to an aspect of the present disclosure.

In FIG. 5, a general system diagram of an architecture implementing an auto blogging content mapping capability is shown. In non-limiting embodiment, a collected contact session log is stored in common contact information data store 500. Common session information manager 502 searches trouble case blog result data store 504 using, for example, key word searching. If the common session information manager 502 does not obtain information from trouble case blog result data store 504, common session information manager 502 requests auto blog result analyzer and reporter 506 to search web logs or blogs on the Internet for information related to solving the issue. Auto blog result analyzer and reporter 506 performs a personalized key word construction, described in greater detail with respect to FIG. 6, to search knowledge management data store 508, problem management data store 510 and device management data store 512 via external system interface manager 516. Subsequently, auto blog result analyzer and reporter 506 uses the personalized key word construction to search Internet blogs 514 via external system interface manager 516. External system interface manager 516 provides a method for communicating with an operational support system providing self-service (e.g., order management, problem management system, device management system). External system interface manager 516 attaches voice files, text files and/or video files received from a unified communications file server 520.

Auto blog result analyzer and reporter 506 stores search results into trouble case blog result data store 504. Auto blog result analyzer and reporter 506 notifies common session information manager 502 of obtained results. Common session information manager 502 associates a blog search identifier with the case number in common contact information data store 500.

Auto blog result analyzer and reporter 506 periodically performs an analysis of data in the trouble case blog result data store 504. Auto blog result analyzer and reporter 506 interacts with common session information manager 502 to associate a case number with a result of searching a preselected set of Internet web logs. Auto blog result analyzer and reporter 506 also analyzes information in the trouble case blog result data store and generates reports to assist internal support 518 in preparing a response for resolving reported issues. Internal support 518 updates knowledge management data store 508 with new self-service methods and procedures for responding to issues. Knowledge management data store 508 automatically updates the preselected set of Internet web logs 514, as well as any other selected Internet web site (e.g., a "frequently asked questions" section of a corporate website). The selected Internet, intranet or otherwise searchable network sites are updated with task flows and steps for implementing a resolution to the reported issue based on direction from internal support 518.

Figure 6:
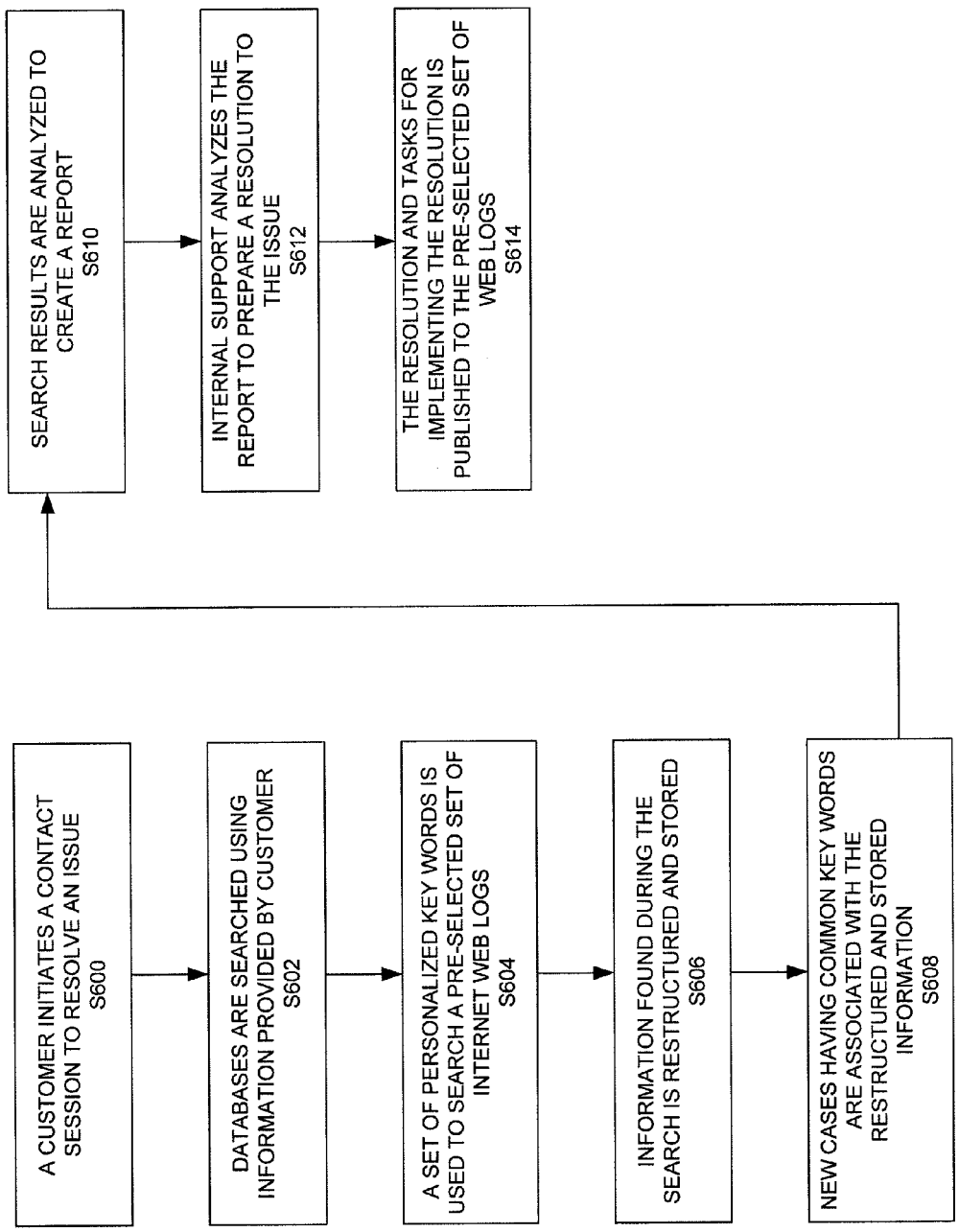
FIG. 6 illustrates a process flow diagram for obtaining personalized key words relating to an issue.

In FIG. 6, a process of obtaining personalized key words relating to an issue is shown. In step S600, a customer initiates a contact session. In step S602, customer profile database, customer previous trouble record, and specific device model information and knowledge management content are searched using information provided by the customer to construct a set of personalized key words. In one embodiment, the set of personalized key words includes the information provided by a customer or obtained from customer communication. In step S604, the set of personalized key words are used to search a pre-selected set of Internet web logs. Information found during a real-time search of the Internet web logs is restructured and stored into trouble case blog result data store in step S606. The result of the real-time search of the Internet web logs is associated with a case number initially provided by a customer or customers. In step S608, new cases initiated by different customers for which a set of personalized key words are shared in common are associated with the result the search of Internet web logs.

In step S610, blog results are analyzed, for example by an auto analyzer tool, to identify patterns and gaps and report is created. In step S612, internal support (i.e., a human agent) further analyzes the report to develop an official resolution text to be incorporated into a knowledge management platform. In step S614, the resolution and tasks for implementing the resolution to a reported issue are published to a preselected set of Internet web logs. In one non-limiting embodiment, the resolution and tasks for implementing the resolution to the reported issue are published to additional intranet or Internet web sites (e.g., a "frequently asked questions" portion of a corporate website).

Accordingly, the present invention enables automated correlation of useful Internet web log information to customer reported issues. The analyzing and reporting of Internet web logs allows an entity to proactively provide official solution to an Internet web blog that is external to the entity. In this manner, the image of the entity may be maintained.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

In one non-limiting example, a service agent determines that a predetermined number of customers are experiencing a common issue. Although the customers may not know each other, the service agent provides a common case number to each of the customers experiencing the same problem. In one embodiment, the service agent obtains consent from each of the customers before initiating a collaborative self-service. It is noted that the service agent need not be human, and need only be able to receive and respond to communications. Accordingly, the service agent may service all of the customers raising the issue together, so as to decrease waiting time for other customers having other issues. For example, the service agent may be an interactive voice response system. The interactive voice response system may determine that a number of customers have issues placing telephone calls on a specified handset. The interactive voice response system conferences each of the customers having the same problem together in a collaborative self-service contact session by providing each of the customers with the case number "5679."

In another non-limiting example, a community of customers may have multiple issues requiring support that they would like to report together, for example, common issues with cellular phone service or cable television picture quality. During a collaborative self-service contact session, the community of customers speak and understand different languages. Each of the customers receives a translation of communication from other customers, when necessary, according to a selected language option. In one embodiment, a customer communicates in the collaborative self-service contact session via an Internet channel, for example, through an Internet chatroom, and receives a translation of other customer communication via the same Internet chatroom. In another embodiment, the customer receives a translation of other customer communication via a different access channel, for example, over a telephone channel, email, text message, or other message delivery system.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission, message delivery, data storage, and communication channels represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for resolving an issue raised by a user, comprising:
    establishing a contact session over a communication channel for servicing the issue;
    searching the Internet for content related to providing a resolution for the issue using a customized query, when a search of a database does not return results;
    restructuring content obtained from an Internet source as a result of searching the Internet using the customized query to prepare the resolution for the issue; and
    updating the Internet source from which the content was obtained with the resolution,
    wherein the user accesses common communication content of the contact session via a first communication channel that is distinct from a second communication channel used by a second user to access the common communication content of the contact session, the second user being joined to the contact session when the second user provides a case number assigned to the contact session of the user, and
    wherein the common communication content from a plurality of file types provided by one of the user and the second user during the contact session is translated by a multi-lingual translator according to a language specified by one of the user and the second user and provided to the other of the user and the second user by a communications channel other than that which the other of the user and the second user have accessed the contact session.

2. The method according to claim 1,
    wherein the customized query is based on one of information provided by the user and stored information.

3. The method according to claim 1,
    wherein the stored information relates to issues previously reported by customers, product information, service contract information, device model information and knowledge management content.

4. The method according to claim 1,
    wherein searching the Internet comprises searching for a pre-selected set of Internet web logs.

5. The method according to claim 1,
    wherein the result of searching the Internet is correlated with the case number provided to the user, and
    wherein the result of searching the Internet and the case number are stored in a second database.

6. The method according to claim 1, further comprising:
    analyzing the content to prepare a task flow to assist the user in implementing the resolution.

7. The method according to claim 6, further comprising:
    updating one of an intranet, the Internet source from which the content was obtained, a knowledge management database, and an Internet website for a service provider with the task flow implementing the resolution.

8. The method according to claim 1,
    wherein one of the restructured content and the updated Internet source is used to assist a subsequent user in resolving a related issue.

9. A system for resolving an issue raised by a user, comprising:
    a processor operable to establish a contact session over a communication channel for servicing the issue;
    a searcher operable to search the Internet for content related to providing a resolution for the issue using a customized query, when a search of a database does not return results;
    a restructuring processor operable to restructure content obtained from an Internet source as a result of searching the Internet using the customized query to prepare the resolution for the issue; and
    an updater operable to update the Internet source from which the content was obtained with the resolution,
    wherein the user accesses common communication content of the contact session via a first communication channel that is distinct from a second communication channel used by a second user to access the common communication content of the contact session, the second user being joined to the contact session when the second user provides a case number assigned to the contact session of the user, and
    wherein the common communication content from a plurality of file types provided by one of the user and the second user during the contact session is translated by a multi-lingual translator according to a language specified by one of the user and the second user and provided to the other of the user and the second user by a communications channel other than that which the other of the user and the second user have accessed the contact session.

10. The system according to claim 9,
    wherein the issue is related to one of products and services provided by a service provider.

11. The system according to claim 9, further comprising:
    a correlator operable to correlate the plurality of file types to the contact session.

12. The system according to claim 11,
    wherein the plurality of file types comprise a video file, an audio file and a text file.

13. A non-transitory computer readable storage medium encoded with an executable computer program for resolving an issue raised by a user and that, when executed by a processor, causes the processor to perform operations comprising:
    establishing a contact session over a communication channel for servicing the issue;

searching the Internet for content related to providing a resolution for the issue using a customized query, when a search of a database does not return results;
restructuring content obtained from an Internet source as a result of searching the Internet using the customized query to prepare the resolution for the issue; and
updating the Internet source from which the content was obtained with the resolution,
wherein the user accesses common communication content of the contact session via a first communication channel that is distinct from a second communication channel used by a second user to access the common communication content of the contact session, the second user being joined to the contact session when the second user provides a case number assigned to the contact session of the user, and
wherein the common communication content from a plurality of file types provided by one of the user and the second user during the contact session is translated by a multi-lingual translator according to a language specified by one of the user and the second user and provided to the other of the user and the second user by a communications channel other than that which the other of the user and the second user have accessed the contact session.

14. The non-transitory computer readable storage medium according to claim 13,
wherein a software trigger obtains key words from common communication content of the contact session to form the customized query.

15. The non-transitory computer readable storage medium according to claim 14,
wherein a subsequent user uses the key words during the contact session.

16. The non-transitory computer readable storage medium according to claim 15,
wherein the customized query is used to assist a subsequent user in resolving a related issue.

17. The method according to claim 1, wherein one of the first and the second communication channel comprises an Internet connection and the other of the first and the second communication channel comprises a telephone connection.

* * * * *